United States Patent [19]

Warlick

[11] 3,952,538
[45] Apr. 27, 1976

[54] PORTABLE SELF-CONTAINED APPARATUS FOR FREEZING LIQUIDS

[76] Inventor: Stearn W. Warlick, Rte. 1, Box 85, Lincolnton, N.C. 28092

[22] Filed: Nov. 20, 1974

[21] Appl. No.: 525,475

[52] U.S. Cl. .................................. 62/342; 62/381; 259/88; 259/DIG. 34; 308/237 R
[51] Int. Cl.² .......................................... A23G 9/10
[58] Field of Search ............. 259/DIG. 34, DIG. 32, 259/88, 84, 85, 87; 62/342, 381; 308/237 R

[56] References Cited
UNITED STATES PATENTS

| | | | |
|---|---|---|---|
| 882,936 | 3/1908 | Fegley | 259/DIG. 34 X |
| 1,473,588 | 11/1923 | Stough | 259/DIG. 34 X |
| 1,609,915 | 12/1926 | Parker | 259/88 X |
| 2,013,501 | 9/1935 | Parker | 62/342 X |
| 2,282,862 | 5/1942 | Genova | 62/342 X |
| 3,452,555 | 7/1969 | Thurman et al. | 62/342 X |
| 3,616,520 | 11/1971 | Bucalo | 308/237 R X |

Primary Examiner—William E. Wayner
Assistant Examiner—William E. Tapolcai, Jr.
Attorney, Agent, or Firm—Bell, Seltzer, Park & Gibson

[57] ABSTRACT

A portable, convenient to use, self-contained apparatus for freezing liquids, such as ice cream, without the necessity of using ice and salt. The apparatus includes a housing with a heat conductive wall therein defining a cooling chamber of generally circular cross-section having an open upper end. A refrigeration device is contained in the housing and cooperates with the heat conductive wall over substantially the entire extent thereof for uniformly cooling the inner surface of the wall. A liquid container of generally circular cross-section corresponding to the shape of the cooling chamber is removably positioned within the cooling chamber in closely spaced relation with the uniformly cooled surface of the heat conductive wall and is adapted for rotation relative thereto. A drive mechanism provided in the housing is disengageably connected to the liquid container for rotating the container within the cooling chamber to thereby provide agitation for the liquid in the container during freezing thereof.

11 Claims, 3 Drawing Figures

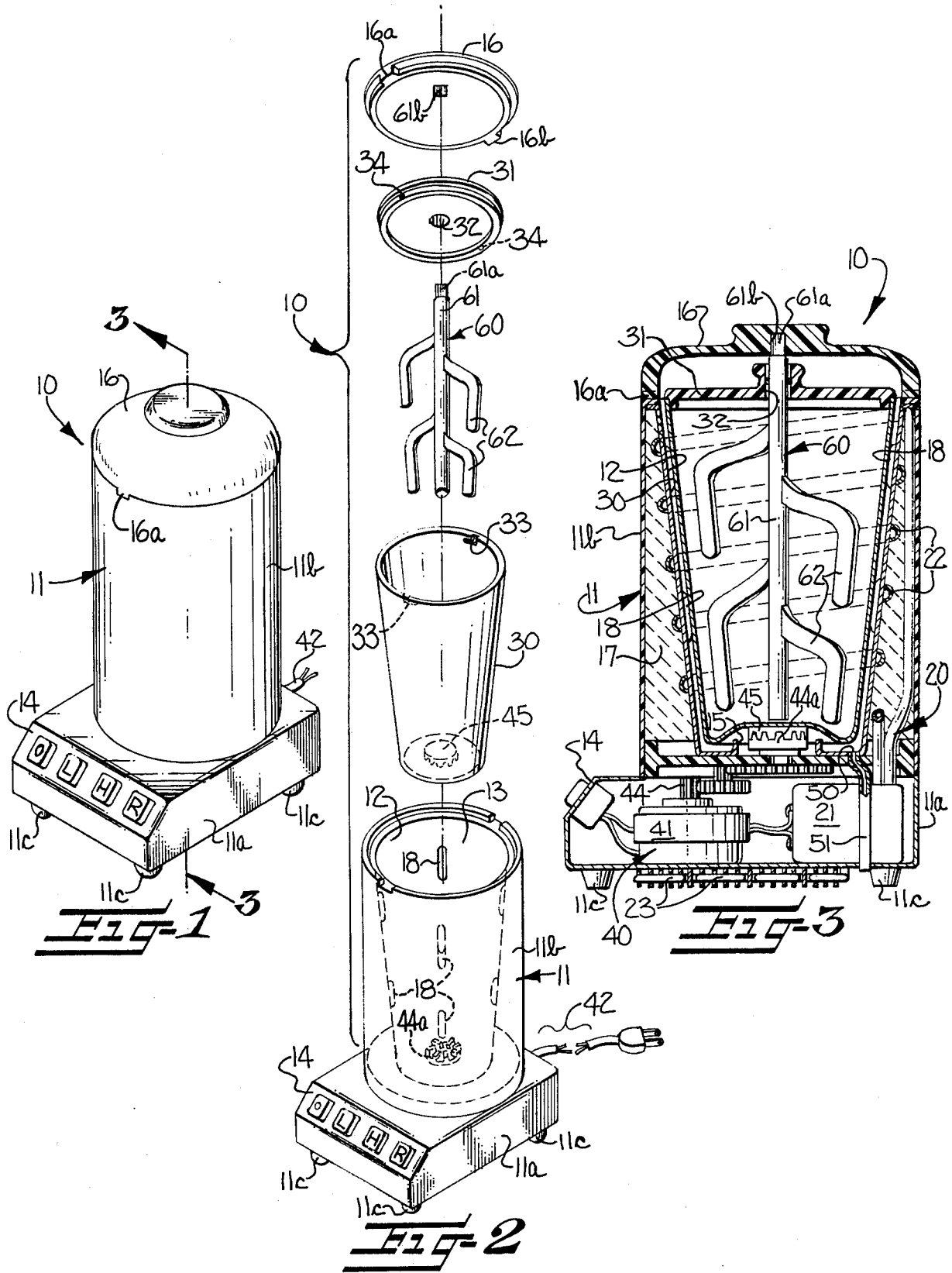

PORTABLE SELF-CONTAINED APPARATUS FOR FREEZING LIQUIDS

This invention relates to a self-containing compact portable apparatus for quickly freezing liquids, such as ice cream, without the necessity of using ice and salt.

Homemade ice cream is conventionally made in a home ice cream freezer of the type wherein a freezer can containing the ice cream mixture to be frozen is positioned in a large container filled with ice and salt. The freezer can is rotated in the ice-filled outer container, either by a hand crank or by an electric motor, while the ice cream mixture in the freezer can is mixed and churned until it freezes into ice cream.

It is generally appreciated that homemade ice cream has a taste and texture which is not duplicated by commercial or "store-bought" ice cream. However, most people find it inconvenient to make homemade ice cream except on infrequent occasions, because of the great deal of preparation and attendant mess involved when using conventional home ice cream freezers. For example, as is well known, it is necessary to obtain a relatively large quantity of ice, which is not always readily available in the home in sufficient amounts, and to mix the ice with salt in proper proportions to form a brine. Because of the mess created by spilling of ice and salt and overflow of brine, it is usually necessary that the home ice cream freezer can be operated outdoors. Thus, the homemade ice cream "season" is most often limited to the warm months when it is comfortable to use the ice cream freezer outdoors. The brine is not only messy, but is corrosive, readily attacking the metal parts of the freezer, and presenting a disposal problem outdoors, since the brine will kill vegetation if spilled or poured thereon.

With the foregoing in mind, it is a primary object of this invention to overcome the aforementioned problems attendant to the use of conventional homemade ice cream freezers.

More particularly, it is a primary object of this invention to provide a portable self-containing apparatus for freezing liquids, such as ice cream, which is of compact size and which contains its own refrigeration system to thereby avoid the necessity of using ice and salt for freezing.

It is a more specific object of this invention to provide an apparatus of the type described which is of a compact size suitable for use in the home as a kitchen appliance which may be stored on the kitchen counter where it is readily available for use whenever homemade ice cream is desired.

While several prior attempts have been made to overcome the aforementioned problems by providing ice cream makers which avoid the need for using ice and salt, none of the same have successfully provided an apparatus suitable for home use which may be readily employed whenever it is desired to make homemade ice cream.

For example, one proposed device provides a motor driven container which is adpated to be positioned within the freezer compartment of the home refrigerator-freezer. In order to operate this device, sufficient space must be found in the home freezer compartment to accommodate the device therein. This presents storage problems in most circumstances, unless the user has an unusually large capacity home freezer, since other frozen goods must be removed from the freezer compartment in order to accommodate the device.

Another proposed device is disclosed in Thurman et al U.S. Pat. No. 3,452,555. The apparatus disclosed therein has an appearance similar to a conventional electric motor-powered home ice cream freezer but has an electric powered refrigeration system also contained therein. The device is large and of complicated construction and would thus be relatively expensive and not particularly suited for home use. The ice cream container is clamped in place inside the device and is not readily removable to permit easily dispensing the ice cream. Additionally, the large size of the device would require that the device be stored when not in use rather than retained on a kitchen counter like other kitchen appliances where it could be readily accessible for use.

In accordance with the present invention, the apparatus is contained in a compact and attractive housing, with a heat conductive wall of closed curved configuration carried by the housing and defining a cooling chamber therein of generally circular cross-section having an open upper end. A refrigeration system is contained in the housing and cooperates with the heat conductive wall over substantially the entire extent thereof for circulating a refrigerant therealong for uniformly cooling the inner surface of the wall. A heat conductive liquid container of generally circular cross-section corresponding to the shape of the cooling chamber is removably positioned within the cooling chamber in closely spaced relation with the uniformly cooled surface of the heat conductive wall and is adapted for rotation relative thereto. Drive means is carried by the housing and extends into a lower portion of the cooling chamber and is disengageably connected to the liquid container for rotating the container within the cooling chamber to thereby provide agitation for the liquid in the container during freezing thereof.

Preferably, a dasher is provided extending into the interior of the liquid container, and means are provided for holding the dasher stationary during rotation of the liquid container to thereby provide further agitation and mixing of the liquid in the container to facilitate uniform freezing thereof.

Also, spacing means in the form of a series of arcuately spaced guide bars are preferably positioned on the inner surface of the heat conductive wall for aiding in maintaining the liquid container centered in the cooling chamber during rotation thereof and for aiding in maintaining an evenly distributed accumulation frost on the wall of the cooling chamber.

According to the preferred embodiment of the invention, the heat conductive wall is of a frusto-conical configuration defining an upwardly flaring frusto-conical shaped cooling chamber having an open upper end, and the liquid container is of a corresponding frusto-conical configuration. This configuration permits the liquid container to be easily positioned within the cooling chamber and easily removed therefrom, and provides compensation for a slight reduction in diameter of the cooling chamber due to an accumulation of front on the refrigerated heat conductive wall by allowing an upward axial movement of the container with respect to the surrounding heat conductive wall. Thus, the upwardly flaring frusto-conical configuration permits maintaining the container in closely spaced relation at all times with the refrigerated inner surface of the heat conductive wall while avoiding binding between the liquid container and the wall of the cooling chamber due to an accumulation of frost on the refrigerated wall.

Some of the objects and advantages of the invention having been stated, others will appear as the description proceeds, when taken in connection with the accompanying drawings, in which FIG. 1 is a perspective view of an apparatus according to the present invention;

FIG. 2 is an exploded, perspective view of the apparatus shown in FIG. 1; and

FIG. 3 is a vertical cross-sectional view taken substantially along the line 3—3 of FIG. 1.

Referring now more particularly to the drawings, the freezer apparatus according to this invention is generally indicated at 10. The apparatus 10 includes a housing 11 having a rectangular box-like hollow base portion 11a for carrying an electric motor and components of the refrigeration system, as will be described in detail hereinafter, and including a generally cylindrical upper housing portion 11b extending upwardly from the base portion 11a. As illustrated, the base portion 11a has a cross-sectional area substantially greater than the cross-sectional area of the upper housing portion 11b to provide an enlarged base or foundation for the apparatus for increased stability. Additionally, the depth of the base portion 11a is illustrated as being at least about one half the overall height of the device, with the heavy refrigeration components and motor, to be described later, being located within the hollow base portion to insure a low center of gravity in the device and to thereby avoid the possibility of accidentally overturning the device.

As illustrated, base portion 11a rests on four feet, collectively indicated at 11c, with one of the feet 11c being positioned at each of the four corners of thee base. The base portion 11a also includes an upwardly facing control panel 14 having a plurality of electrical switches thereon as will be described in detail hereinafter.

Located within the upper housing portion 11b is a heat conductive wall 12 in the form of a closed curved configuration which defines therein a cooling chamber 13 of generally circular cross-section in the upper portion of the device. According to the preferred embodiment of the invention illustrated, the wall 12 is of a frusto-conical configuration defining an upwardly flaring frusto-conical cooling chamber 13. A cooling chamber cover 16 is provided to fit over the open upper end of the cooling chamber 13 to aid in insulating the same. As best seen in FIG. 3, the substantially cylindrical walls of upper housing portion 11b and the generally frusto-conical shaped wall 12 define theerebetween a void, which may be suitably filled with a lightweight insulating material 17, such as styrofoam, to improve the efficiency of freezing and to avoid the formation of condensation on the outer surface of the walls of upper housing portion 11b.

Refrigeration means, broadly indicated at 20, is contained within the housing 11 for uniformly cooling the heat conductive wall 12. The refrigeration means 20 comprises a commercially available miniature refrigeration system, including a compressor 21, located within the hollow base portion 11a, an evaporator coil 22 surrounding the heat conductive wall 12, and a condenser coil 23 located on the underside of the base portion 11a. As illustrated, the evaporator coil 22 encircles the heat conductive wall 12 over substantially the entire extent thereof so that the entire inner surface of wall 12 is uniformly cooled. It is preferred, to insure a permanent, close, heat transferring relationship between the evaporator coil 22 and wall 12, to weld or similarly bond the evaporator coil 22 to the outer surface of wall 12. In this way, expansion and contraction of the evaporator coil 22, which normally takes place as the evaporator coil changes temperature, is minimized, thus eliminating the possibility that heat transfer efficiency will decrease over the life of the apparatus. Alternatively, evaporator coil 22 may be formed in the wall 12 as an integral part thereof.

The apparatus also includes a liquid container 30 for containing the liquid mix to be frozen. The liquid container is preferably formed of a heat conducting material such as aluminum. A lid 31, of suitable material such as plastic, is provided to fit snugly in mating relation over the top of the liquid container 30 to enclose the liquid contained therein. To facilitate inserting and removing the container in the cooling chamber, a knob is provided in middle of lid 31 and suitable latch means is provided for retaining lid 31 securely on container 30. As illustrated, the latch means is in the form of a pair of opposing bayonet sockets 34 on container 30 and corresponding bayonet projections 35 on lid 31. According to the illustrated preferred embodiment of the invention, the liquid container 30 is of a frusto-conical configuration for being removably matingly positioned in closely spaced relation with the refrigerated wall 12 defining the cooling chamber 13.

Preferably, to aid in maintaining the liquid container 30 centered in the cooling chamber 13, and to aid in maintaining an evenly distributed accumulation of frost on wall 12, a plurality of vertically extending guide bars 18 are provided in arcuately spaced relation around the inner surface of wall 12. These guide bars are suitably formed of a low friction material such as nylon to provide a low friction bearing surface to guide the rotation of liquid container 30 within cooling chamber 13, and to facilitate inserting and removing the container.

As best illustrated in FIG. 3, drive means, generally indicated at 40, is provided in the base portion 11a for rotating container 13 within the cooling chamber. The drive means 40 includes an electric motor 41, located within the hollow base portion 11a and suitably connected to an electrical outlet by an electrical cord 42. The drive means also includes a drive gear 44a located centered at the bottom of the cooling chamber 13, and a gear train 44 interconnecting the drive gear 44a with the electric motor 41. The liquid container 30 includes on the lower surface thereof a gear 45, which matingly engages drive gear 44a when the container is positioned within the cooling chamber 13.

In order to make ice cream with the apparatus of this invention, the liquid container 30 is filled with the desired amount of ice cream mix and is placed in the cooling chamber 13 with the gear 45 matingly engaging the drive 44a, The electric motor 41 is activated by depressing a "low speed" electric switch L, located on control panel 14. The switch L also activates the compressor 31 and as the container 30 rotates, refrigerating fluid is circulated through the evaporator coils 22 cooling the heat conductive wall 12 and the liquid container 30.

As wall 12 cools, condensate will form thereon from the humidity in the ambient air. As this condensate accumulates, it will flow to the bottom of cooling chamber 13. To prevent the condensate from overflowing into the base portion 11a, the lower portion of wall 12 forming the bottom of the cooling chamber 30 includes an upturned flange 15 defining a trough at the bottom of the cooling chamber. A drain 50 is provided in the trough and a drainage tube 51 is connected thereto to carry away the condensate. During continued operation of the device, the condensate on the wall 12 may freeze and gradually accumulate as a layer of frost along the inner surface of wall 12. The guide bars 18 located on the inner walls 12 of the cooling chamber 13 act to delay this occurence by aiding in maintaining an evenly distributed accumulation of frost. However, when the frost accumulates to a thickness greater than the thickness of the guide bars 18, and the diameter of the cooling chamber is thus effectively reduced, the mating frustoconical shape of the liquid container and the cooling chamber 13 causes the liquid container to shift slightly axially upwardly, in effect, reducing the overall diameter of the liquid container 30 at any given point relative to the cooling chamber 13 and thus compensating for this reduction in diameter. Thus, any binding of the container 30 within the cooling chamber 13 is avoided. At this point, the rotating container bears directly against the layer of frost, which provides effective lubrication and heat transfer between the container 30 and the cooling chamber 13.

To prevent disengagement of the drive gear 44a from the gear 45 on the underside of container 30 as the liquid container 30 shifts upwardly, the cooperating gear teeth on gear 44a and gear 45 are formed of a sufficient length so as to remain in mating engagement during slight upward axial movement of the container.

In order for the liquid contained within the liquid container 30 to freeze evenly, the liquid is preferably agitated. While adequate agitation may be provided merely from the rotation of the container, due to the frusto-conical shape thereof, in the preferred embodiment of this invention a dasher 60 is provided extending into the liquid container to provide additional agitation to the liquid therein. As illustrated, dasher 60 includes a dasher shaft 61 having a plurality of radially extending blades 62 carried thereby. The upper portion of dasher shaft 61 extends axially upwardly through a hole 32 in the lid 31 of container 30, and shaft 61 is preferably held stationary relative to the rotating liquid container. To hold dasher shaft 61 in stationary position relative to the rotating liquid container, the cooling chamber cover 16 is provided with a cavity 61b therein of a predetermined configuration, such as a square, for matingly receiving therein a correspondingly shaped upper end portion 61a of the dasher shaft 61. Rotation of the cooling chamber cover 16 is prevented by an opposed pair of radially extending tabs 16a and 16b integrally formed on the rim of cover 16 and being cooperatively received in a pair of correspondingly shaped recesses 13a and 13b on the upper rim of upper housing portion 11b.

As the liquid in container 30 freezes, an increasing resistance is exerted against dasher 60, until ultimately, motor 41 stalls and rotation of the liquid container ceases. It is therefore advisable to provided the motor 41 with an overloaded mechanism which automatically shuts off the motor 41 when this point is reached. At this point the ice cream should be substantially frozen. If however, further hardening is desired, or if it is desired to keep the ice cream frozen for later use, a switch R is provided on the control panel 14 which bypasses the motor 41 and operates only the compressor 21. Additionally, a switch H is provided on control-panel 14 which provides for high speed operation of motor 41, when this is desired. An "off" switch O is also provided on the control panel 14, which when depressed, shuts off both the motor 41 and compressor 21.

To serve the ice cream it is necessary only to remove the cooling chamber cover 16, then the liquid container lid 31 and the dasher 60. The liquid container 30 need not necessarily be removed. If it is desired to remove the liquid container 30, as for example, to clean it, it may be easily and simply removed merely by lifting it out of the cooling chamber 13.

Thus it may be seen that this invention provides a portable self-contained apparatus for fast freezing liquids such as ice cream without the use of ice and salt. Its construction provides an efficient and evenly distributed freezing operation while allowing easy removal of the frozen liquid therefrom.

In the drawings and specification there is set forth a preferred embodiment of the invention, and while specific terms employed to aid in understanding the invention, they are used in a generic and descriptive sense only and not for purposes of limitation——the invention being defined by the claims.

That which is claimed is:

1. A portable, self-contained apparatus for freezing liquids, such as ice cream, without the use of ice and salt and being characterized by a construction providing efficient and uniform freezing of the liquid and ease of removal of the frozen liquid therefrom, said apparatus comprising;

a housing a heat conductive wall of a closed curved configuration carried by said housing and defining a cooling chamber therein of generally circular cross-section having an open upper end;

refrigeration means contained in said housing and cooperating with said heat conductive wall over substantially the entire extent thereof for circulating a refrigerant therealong for uniformly cooling the inner surface of said wall;

means cooperating with the inner surface of said heat conductive wall adjacent the lower end thereof for receiving any condensation draining from the cooled inner surface of the wall;

a heat conductive liquid container of generally circular cross-section corresponding to the shape of said cooling chamber, said container being removably positioned in said cooling chamber and adapted for rotation relative thereto, and said container being positioned in closely spaced relation with the uniformly cooled inner surface of said heat conductive wall for being quickly and uniformly cooled thereby;

drive means carried by said housing and extending into a lower portion of said cooling chamber and being disengageably connected to said liquid container for rotating the container within said cooling chamber to thereby provide agitation for the liquid in the container during freezing thereof; and spacing means positioned on the inner surface of said heat conductive wall for aiding in maintaining the liquid container centered in said cooling chamber during rotation thereof and for aiding in maintaining an evenly distributed accumulation of frost on said heat conductive wall.

2. Apparatus according to claim 1, additionally including a dasher extending into the interior of said liquid container, and means cooperating with said housing and being operably connected to said dasher for holding the dasher stationary during rotation of the liquid container for further agitating the liquid in said container to facilitate uniform freezing thereof.

3. Apparatus according to claim 1, wherein said spacing means comprises an arcuately spaced series of guide bars of a low-friction material on the inner surface of said heat conductive wall serving to provide a low-friction bearing surface for rotation of said liquid container thereagainst.

4. A portable, self-contained apparatus for freezing liquids, such as ice cream, without the use of ice and salt and being characterized by a compact and stable construction providing efficient and uniform freezing of the liquid and ease of removal of the frozen liquid therefrom, said apparatus comprising:
- a housing including a hollow base portion and an upper housing portion carried by said base portion and extending upwardly therefrom, said base portion being of a substantially larger cross-sectional area than said upper housing portion and having a depth of at least one half the overall height of the apparatus to thereby provide a stable foundation for the apparatus;
- a heat conductive wall of a closed curved configuration located inside said upper housing portion and defining a cooling chamber therein of generally circular cross-section having an open upper end;
- refrigeration means cooperating with said heat conductive wall over substantially the entire extent thereof for circulating a refrigerant therearound for uniformly cooling the inner surface of said wall, said refrigeration means including a refrigeration compressor located in said hollow base portion below said cooling chamber, a condenser coil operatively connected to said refrigeration compressor, and an evaporator coil surrounding said heat conductive wall and being operatively connected to said refrigeration compressor and to said condenser coil;
- a heat conductive liquid container of generally circular cross-section corresponding to the shape of said cooling chamber, said container being removably positioned in said cooling chamber and adapted for rotation relative thereto,
- a plurality of spacing members carried by the inner surface of said heat conductive wall at spaced apart locations therearound and bearing against said liquid container so as to maintain the container centered in said cooling chamber and in closely spaced relation with the uniformly cooled inner surface of said heat conductive wall for being quickly and uniformly cooled thereby; and
- drive means cooperating with said liquid container for rotating the container within said cooling chamber to thereby provide agitation for the liquid in the container during freezing thereof, said drive means including an electric motor located in said hollow base portion, a drive gear located in the lower portion of said cooling chamber and being releasably connected in driving engagement to said liquid container for imparting rotation thereto, and means operatively interconnecting said electric motor and said drive gear.

5. Apparatus according to claim 4 additionally including a dasher extending into said liquid container from the upper end thereof; and cooling chamber cover carried by said upper housing portion and enclosing the open upper end of said cooling chamber, said cover including means engaging the upper end of said dasher for holding the dasher stationary during rotation of the liquid container to thereby provide further agitation to the liquid in said container to facilitate uniform freezing thereof.

6. A portable self-contained apparatus for freezing liquids, such as ice cream, without the use of ice and salt and being characterized by a construction providing efficient and uniform freezing of the liquid and ease of removal of the frozen liquid therefrom while compensating for frost accumulation during the freezing operation, said apparatus comprising:
- a housing;
- a heat conductive wall of generally frusto-conical configuration carried by said housing and defining therein an upwardly flaring frustoconical cooling chamber having an open upper end;
- refrigeration means contained in said housing and cooperating with said heat conductive wall over substantially the entire extent thereof for circulating a refrigerant therealong for uniformly cooling the inner surface of said wall;
- a heat conductive liquid container of generally frusto-conical shape corresponding to the shape of said cooling chamber, said container being removably positioned in said cooling chamber and adapted for rotation relative thereto, and said container being positioned in closely spaced relation with the uniformly cooled inner surface of said heat conductive wall for being quickly and uniformly cooled thereby while allowing upward axial movement of said container with respect to said conductive wall for compensating for accumulation of frost thereon; and
- drive means extending into a lower portion of said cooling chamber and being disengageably connected to said liquid container for rotating the container relative to said wall to thereby provide agitation for the liquid in the container during freezing thereof.

7. Apparatus according to claim 6, including a plurality of spacers positioned on the inner surface of said heat conductive wall for aiding in maintaining the liquid container centered in said cooling chamber during rotation thereof and for aiding in maintaining an evenly distributed accumulation of frost on the inner surface of said heat conductive wall.

8. Apparatus according to claim 6 wherein said drive means includes an electric motor carried by housing and located below said cooling chamber, a drive gear located in the lower portion of said cooling chamber, and means operatively interconnecting and electric motor and said drive gear, and wherein the underside of said liquid container has gear means thereon cooperating with said drive gear for providing a releasable driving engagement therebetween.

9. Apparatus according to claim 8, wherein said gear means on said container and said drive gear in said cooling chamber have cooperating teeth of a length sufficient to maintain driving engagement during slight upward axial movement of the container in said cooling chamber due to an accumulation of frost on said heat conductive wall.

10. Apparatus according to claim 6, including a dasher extending into the interior of said liquid container, and means cooperating with said housing and being operably connected to said dasher for holding the dasher stationary relative to the container during rotation thereof for further agitating the liquid in said container to facilitate uniform freezing thereof.

11. A portable self-contained apparatus for freezing liquids, such as ice cream, without the use of ice and salt and being characterized by a construction providing efficient and uniform freezing of the liquid and ease of removal of the frozen liquid therefrom while compensating for frost accumulation during the freezing operation, said apparatus comprising:
- a housing, including a hollow base portion and an upper housing portion carried by said base portion and extending upwardly therefrom;
- a heat conductive wall of generally frusto-conical configuration located in said upper housing portion and defining therein an upwardly flaring frusto-conical cooling chamber having an open upper end;
- refrigeration means cooperating with said heat conductive wall over substantially the entire extent thereof for circulating a refrigerant therearound for uniformly cooling the inner surface of said wall, said refrigeration means including a refrigeration compressor located in said hollow base portion below said cooling chamber, a condenser coil operatively connected to said refrigeration compressor, and an evaporator coil surrounding said heat conductive wall and being operatively connected to said refrigeration compressor and to said condensor coil;
- a heat conductive liquid container of generally frusto-conical shape corresponding to the shape of said cooling chamber, said container being removably positioned in said cooling chamber and adapted for rotation relative thereto, and said container being positioned in closely spaced relation with the uniformly cooled inner surface of said heat conductive wall for being quickly and uniformly cooled thereby while allowing upward axial movement of said container with respect to said heat conductive wall for compensating for accumulation of frost thereon;
- drive means cooperating with said liquid container for rotating the container within said liquid chamber to thereby provide agitation for the liquid in the container during freezing thereof, said drive means including an electric motor located in said hollow base portion, a drive gear located in the lower portion of said cooling chamber and being releasably connected in driving engagement to said liquid container for imparting rotation thereto, and means operatively interconnecting said electric motor and said drive gear;
- a dasher extending into said liquid container from the upper end thereof; and
- a cooling chamber cover carried by said upper housing and enclosing the open end of said cooling chamber, said cover including means engaging the upper end of said dasher for holding the dasher stationary during rotation of the liquid container to thereby provide further agitation to the liquid in said container to facilitate uniform freezing thereof.

* * * * *

UNITED STATES PATENT AND TRADEMARK OFFICE
CERTIFICATE OF CORRECTION

PATENT NO. : 3,952,538

DATED : April 27, 1976

INVENTOR(S) : Stearn W. Warlick

It is certified that error appears in the above-identified patent and that said Letters Patent are hereby corrected as shown below:

Column 1, Line 10, "large" should be --larger--;
Column 1, Line 41, "containing" should be --contained--;
Column 2, Line 18, after "of" insert --a--;

Column 2, Line 59, "front" should be --frost--;
Column 3, Line 34, "thee" should be --the--;
Column 3, Line 51, "thee" should be --the--;
Column 4, Line 56, after "drive" insert --gear--;
Column 4, Line 59, "31" should be --21--;

Column 5, line 14, "frustoconical" should be --frusto-conical--;
Column 5, Line 60, "overloaded" should be --overload--;
Column 6, Line 19, after "terms" insert --are--;
Column 7, Line 66, after "and" insert --a--;
Column 8, Line 17, "frustoconical" should be --frusto-conical--;
Column 8, line 32, after "said", second occurrence, insert --heat--;
Column 8, Line 49, after "by" insert --said--;
Column 8, line 52, "and", second occurrence, should be --said--.
Column 10, Line 25, after "open" insert --upper--.

Signed and Sealed this

Seventh Day of September 1976

[SEAL]

Attest:

RUTH C. MASON
Attesting Officer

C. MARSHALL DANN
Commissioner of Patents and Trademarks